UNITED STATES PATENT OFFICE.

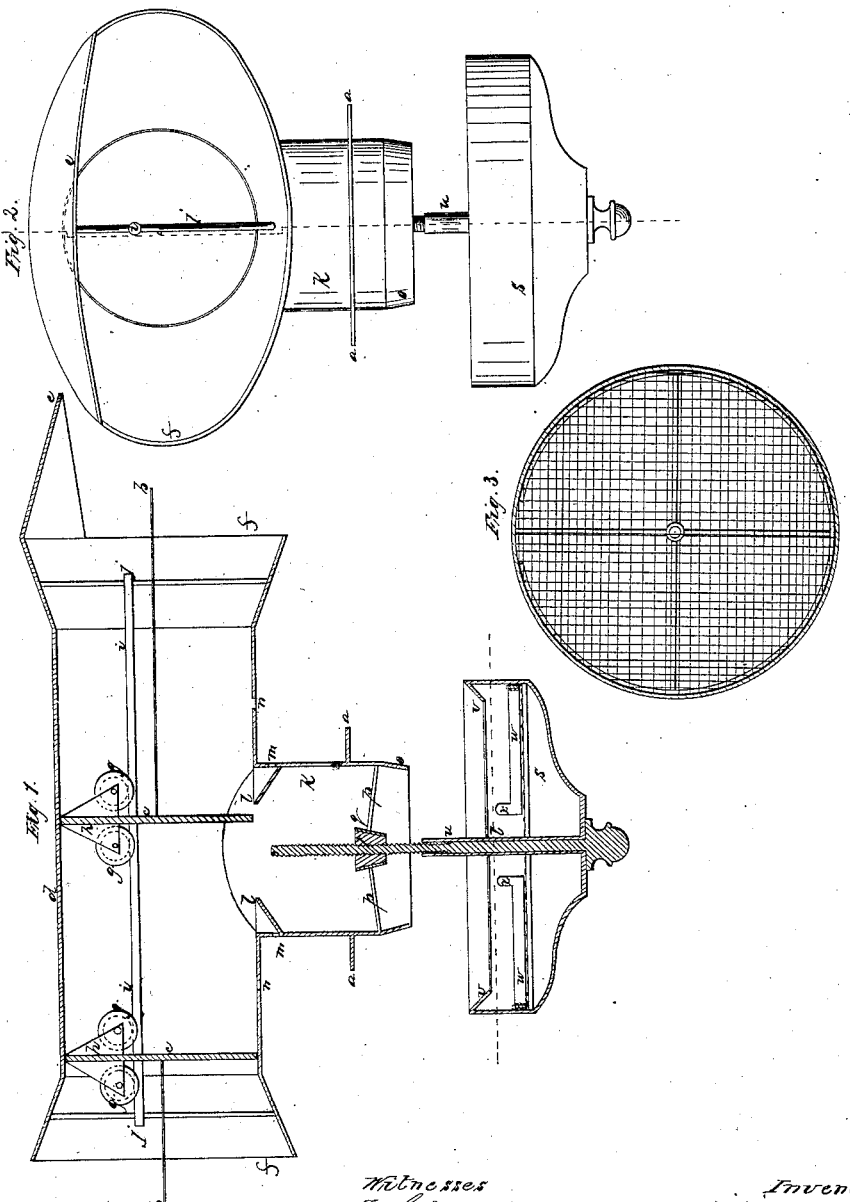

WILLIAM WESTLAKE, OF MILWAUKEE, WISCONSIN, ASSIGNOR TO HIMSELF AND CHAS. L. RICE, OF SAME PLACE.

IMPROVEMENT IN VENTILATORS FOR RAILROAD-CARS.

Specification forming part of Letters Patent No. 36,063, dated July 29, 1862.

*To all whom it may concern:*

Be it known that I, WILLIAM WESTLAKE, of the city of Milwaukee, in the State of Wisconsin, have invented a certain new and useful Improvement in Car Ventilators or Dusters; and I do hereby declare that the following is a full, clear, and exact description thereof, reference being had to the accompanying drawings, and to the letters and marks thereon.

Of the drawings forming part of this specification, Figure 1 is a view by vertical section of a ventilator with my improvement attached thereto or connected therewith, while Fig. 2 is an end view of the ventilator, and Fig. 3 a top view of the pan or dust-receptacle of the same.

In each of these figures where like parts are shown like marks and letters are used to indicate the parts.

In general it is designed to use five of these ventilators on each car, the flange $a$ of each ventilator resting upon the roof of the car, and the wires or rods $b$ of each sliding valve $c$ being so connected to one common rod or cord that by such rod or cord the valves can all be operated at once from each end of the car.

As is shown by the drawings, this ventilator has a cylindrical body, $d$, lying in a horizontal line above the roof of the car, one or both ends of which body can have a peak or hood, $e$, to prevent a storm from driving within it, and also mouths or expanded ends $f$.

The valves $c$ are supported by friction-rollers $g$, which have their bearings in plates $h$, attached to the valves, and by the friction-rollers traversing rods $i$, secured to end rods $j$, the valves are readily moved, as may be desired.

At the center of the body $d$ a cylinder, $k$, extends downward, so that the lower part of it will be within the car. Just below the point of union of the cylinder $k$ to the cylinder $d$ are lips $l$, which are for the purpose of directing any water that may be driven into cylinder $d$, so that it may run out onto the roof of the car through the holes $m$. Holes $n$ are also in cylinder $d$ for allowing the water to escape. The lower end of the cylinder $k$ is contracted or bent inward, $o$, for the purpose of concentrating and directing the air or wind to the center of the pan or receptacle. Braces $p$ from the inner surface of cylinder $k$ hold in the center of this cylinder a conical or pyramidal socket, $q$, having three sides only, or being slotted, so that the conical or pyramidal nut $r$ may readily be fitted into or taken out of it, and thus the pan or receptacle be attached to or detached from the cylinder $k$.

The pan or receptacle $s$ will be just below the ceiling within the car. The rod $t$, passing through a tube, $u$, in its center, and through the nut $r$, makes its means of attachment to the cylinder $k$. A portion of this rod $t$ has upon it a screw-thread, as is shown by Fig. 1, a like thread being in the nut $r$, so that the pan may be brought nearer to the lower end of cylinder $k$ or carried farther from it, as may be desirable. This pan is intended to have water within it to about the red line of Fig. 1 of the drawings. The flange $v$ or hoop of this pan will tend to keep the water from getting out of it, as also to prevent the dust from being driven out of it. A cloth (indicated by the crossed red lines in Fig. 3 and by the deep red line in Fig. 1) is attached to a spring-hoop, $w$, and placed within the pan. The ends of this spring-hoop are turned up, $x$ $x$, and form handles, so that when these handles are forced close to each other the hoop-spring will be sufficiently compressed to allow of its removal from the pan with the cloth, and thus whatever dust or dirt may be accumulated upon the cloth may be readily washed off and the hoop and cloth then be again placed in the pan. When the water in the pan may have become foul, or when from any cause it may be desirable to remove the pan, this may easily be accomplished by simply lifting the nut $r$ out of the socket $q$.

From this description of the construction and operation of my invention it will readily be seen that ample provision is made for the passage of pure air into the cars and for the freeing of the air from dust or any impurities that can be taken from it by directing it upon water, while full facilities are given for the ready cleaning of the dust pan or receptacle. It will also be seen that ample provision is made for the direction of the current of air, for the regulation of the velocity of the current through the ventilator and against rainy or stormy weather.

What I claim as my invention, and desire to secure by Letters Patent, is—

1. Contracting the lower end, o, of the cylinder k, for concentrating and directing the current of air to the pan or dust-receptacle, as set forth.

2. The pan or receptacle s, provided with the flange or deflection v, with the spring-hoop and cloth, and with the adjusting-rod t and nut r, as described.

This specification signed this 11th day of June, 1862.

WILLIAM WESTLAKE.

Witnesses:
GEO. COGSWELL,
W. W. PERRINE.